United States Patent [19]

Agulia

[11] Patent Number: 5,094,269

[45] Date of Patent: Mar. 10, 1992

[54] LIQUID FERTILIZER METERING SYSTEM

[76] Inventor: John T. Agulia, 2402 4th St., House #1, Santa Monica, Calif. 90405

[21] Appl. No.: 624,070

[22] Filed: Dec. 3, 1990

Related U.S. Application Data

[63] Continuation-in-part of Ser. No. 367,842, Jun. 19, 1981, Pat. No. 4,974,634.

[51] Int. Cl.$^5$ .............................................. E03B 7/07
[52] U.S. Cl. .................................................. 137/564.5
[58] Field of Search ................ 137/564.5, 205.5, 268; 222/386.5, 389

[56] References Cited

U.S. PATENT DOCUMENTS

| | | | |
|---|---|---|---|
| 2,153,240 | 4/1939 | Dailey et al. | 137/564.5 X |
| 3,198,438 | 8/1965 | Hultgren | 137/564.5 X |
| 3,204,661 | 9/1965 | Young | 137/564.5 |
| 3,220,435 | 11/1965 | Ellingson | 137/564.5 |
| 3,720,230 | 3/1973 | Stockstill et al. | 137/564.5 |
| 3,726,304 | 4/1973 | Cook | 137/564.5 X |
| 4,406,406 | 9/1983 | Knapp | 137/564.5 X |
| 4,418,869 | 12/1983 | Healy | 137/564.5 X |
| 4,736,769 | 4/1988 | Belanger | 137/564.5 |
| 4,974,634 | 12/1990 | Agulia | 137/564.5 |

FOREIGN PATENT DOCUMENTS 0001559  1/1977  Japan .................................. 137/564.5

Primary Examiner—John Rivell
Attorney, Agent, or Firm—Frank L. Zugelter

[57] ABSTRACT

A liquid fertilizer metering apparatus 130 which includes a metering assembly 148, FIGS. 11-18, that meters through its orifice 155 the liquid material contained in a pliable bag 134 disposed in a sealed pocket 132 of the apparatus. A passageway 142 from an exit pressure location in an Venturi tube 141 provides water flow into pocket 132 to pressurize bag 134, thereby discharging the liquid material through the metering assembly 148 and into another passageway 145 in the apparatus that is connected to the restricted throat 142 of the Venturi tube, thus releasing such material into the water flow conduit to which the tube is attached. Metering assembly 148 comprises a hollow housing 150 mounted in the wall 156 forming pocket 132, a hollow sleeve 153 snapped into housing 150, and a metering orifice plate 152 secured in housing 150 by sleeve 153. Sleeve 153 sealingly attaches to bag 134 while housing 150 seats in wall 156, to provide a quick and efficient manner of exchanging a collapsed bag for a filled bag of liquid material in pocket 132.

4 Claims, 6 Drawing Sheets

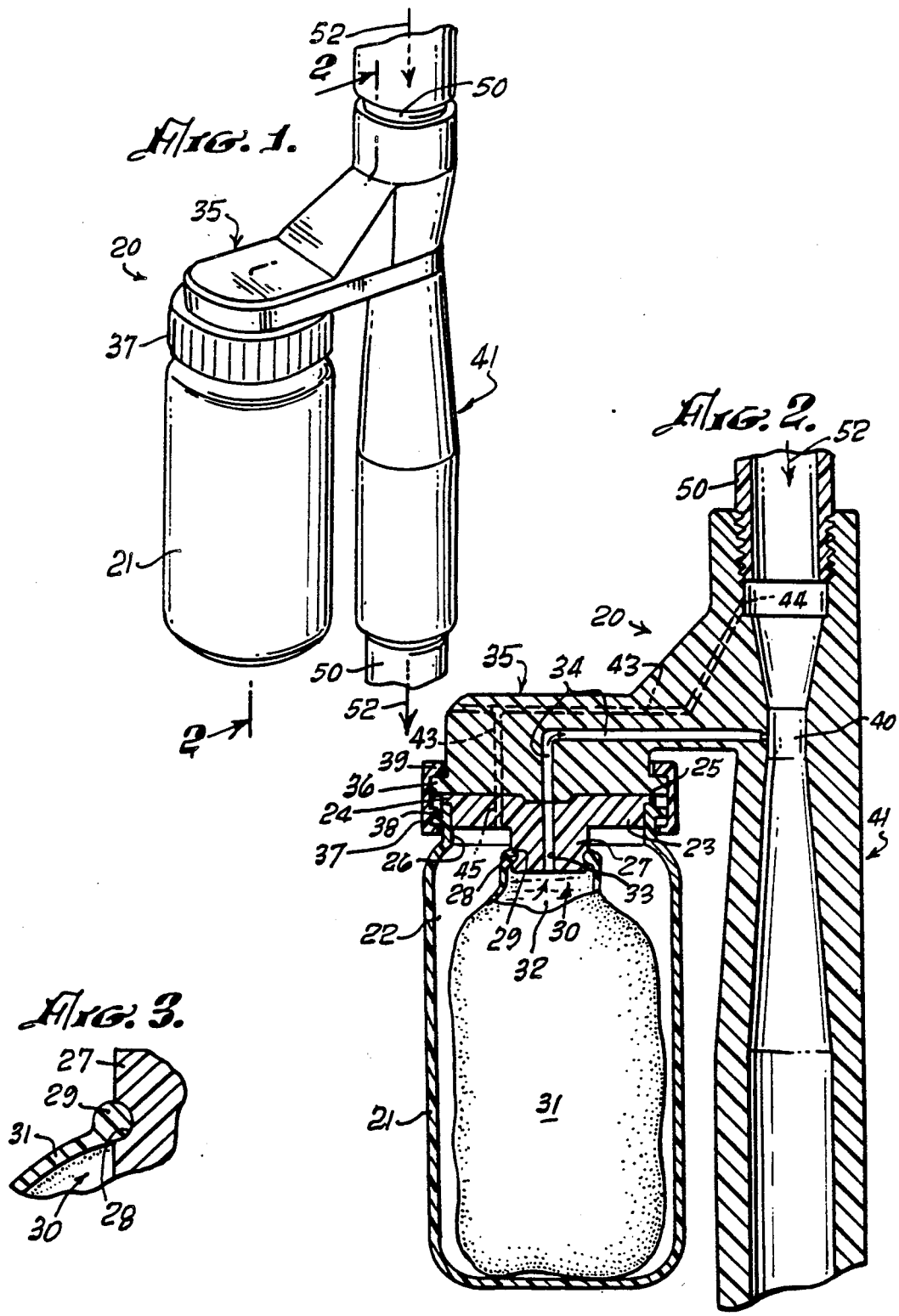

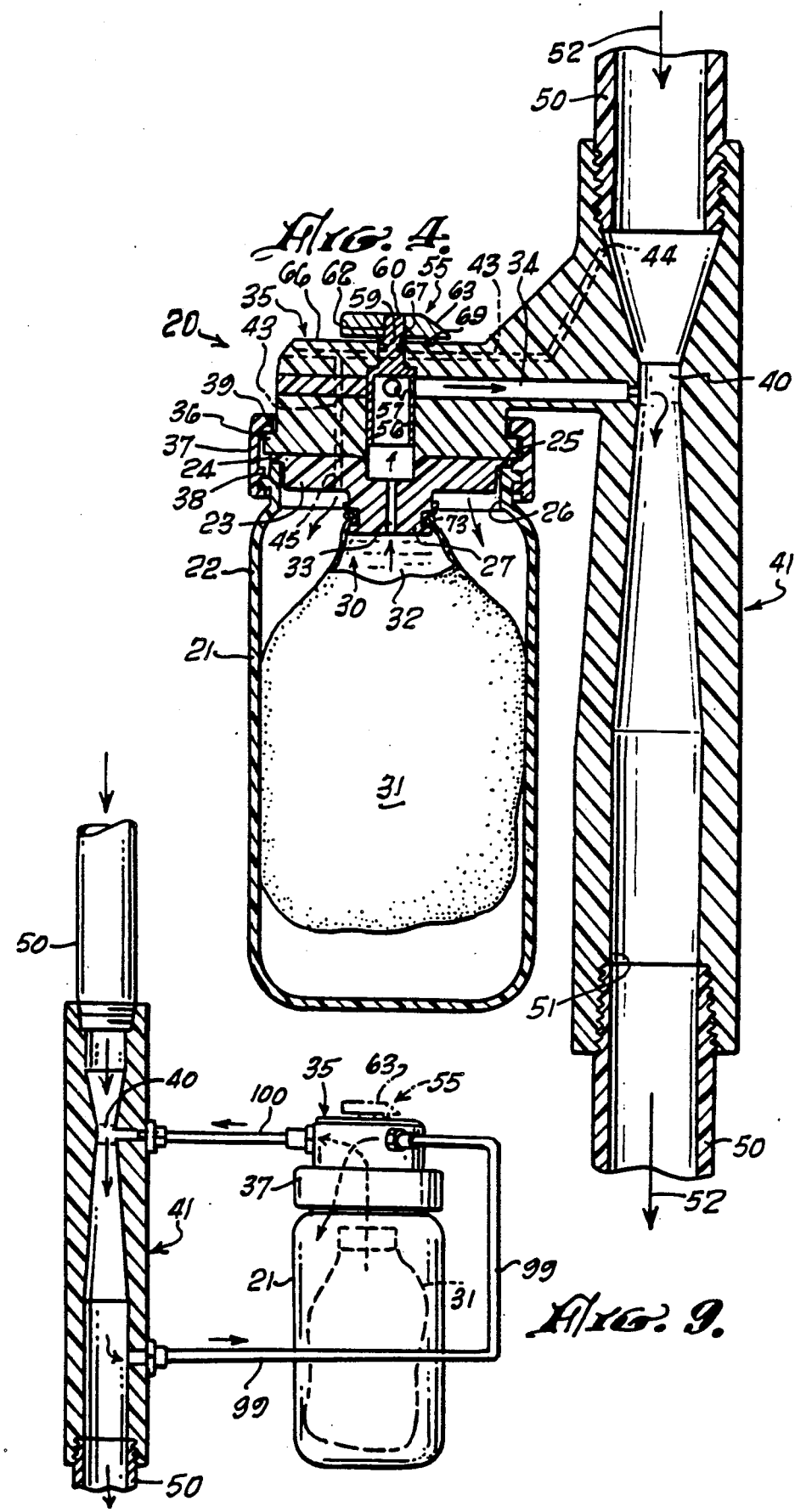

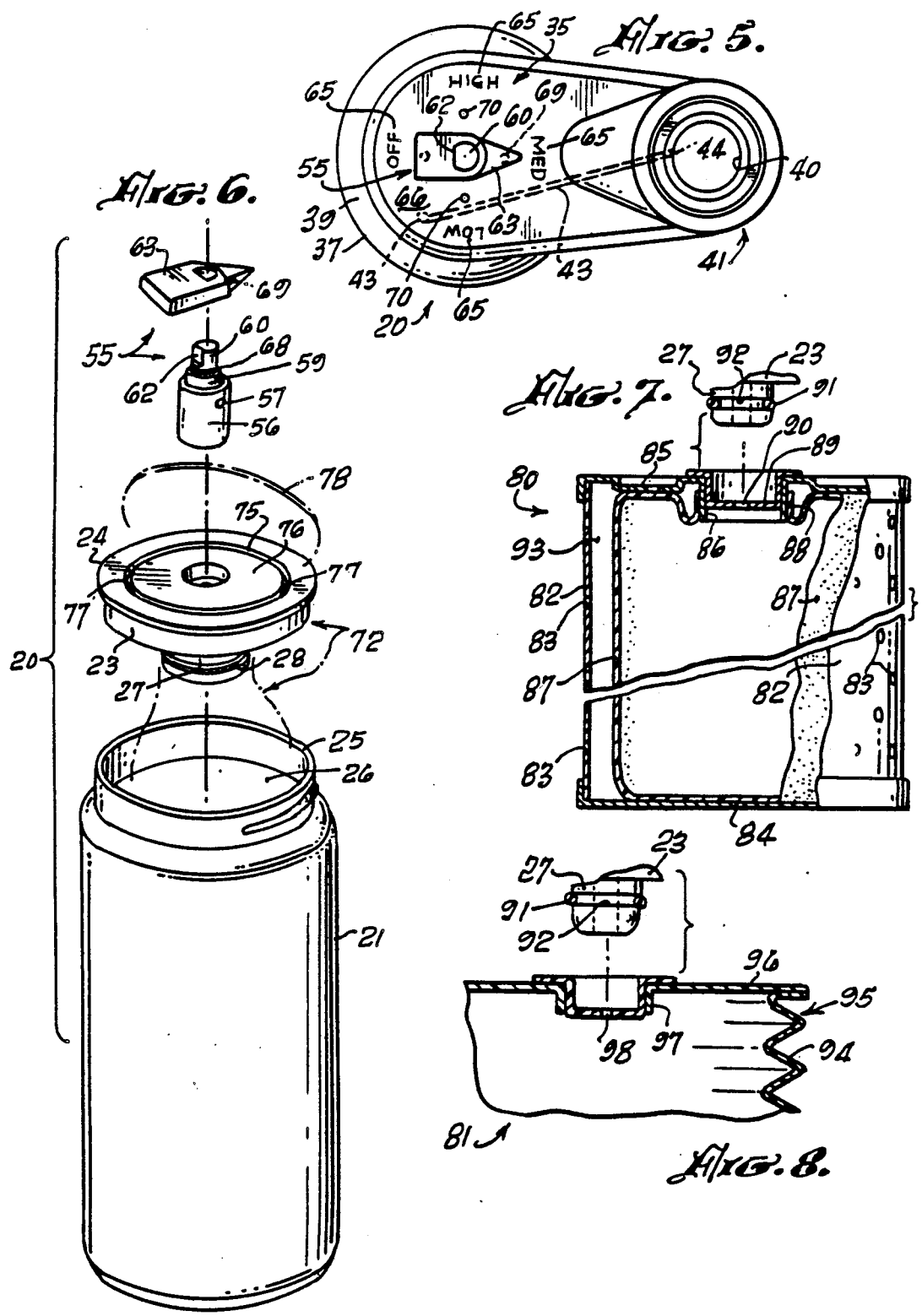

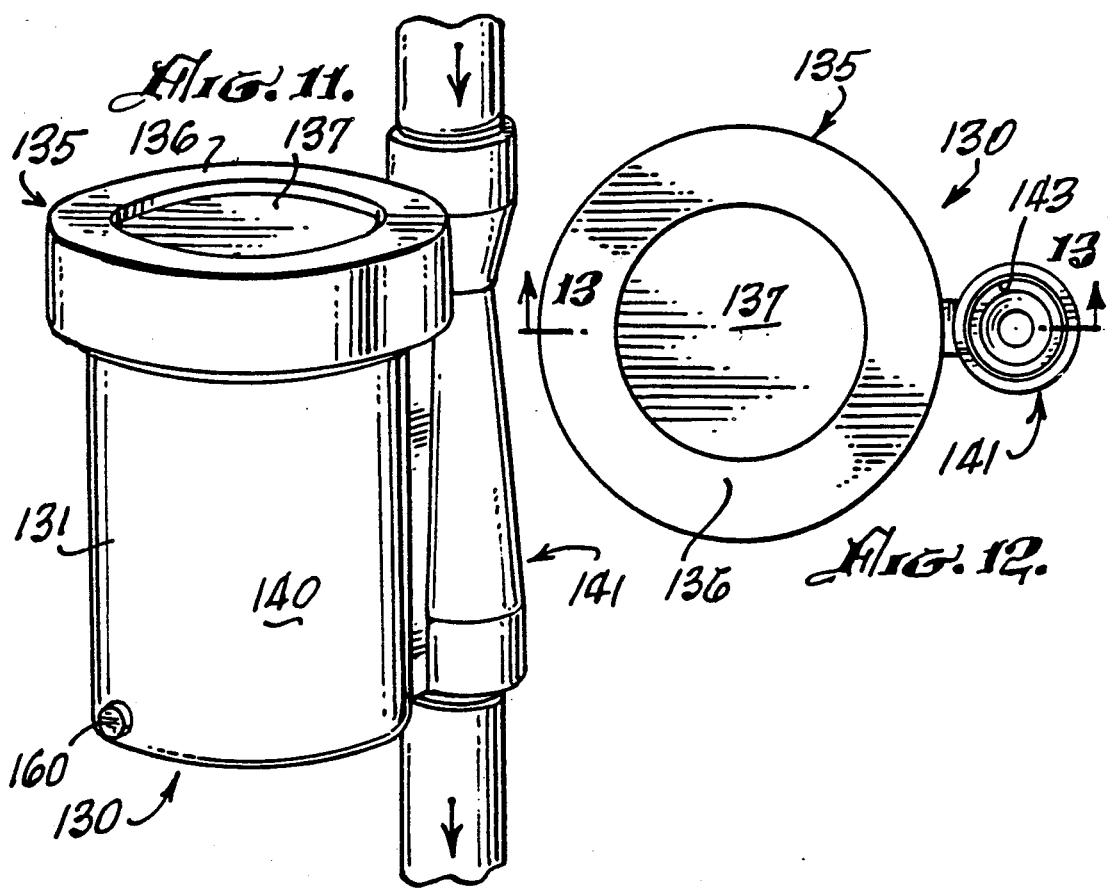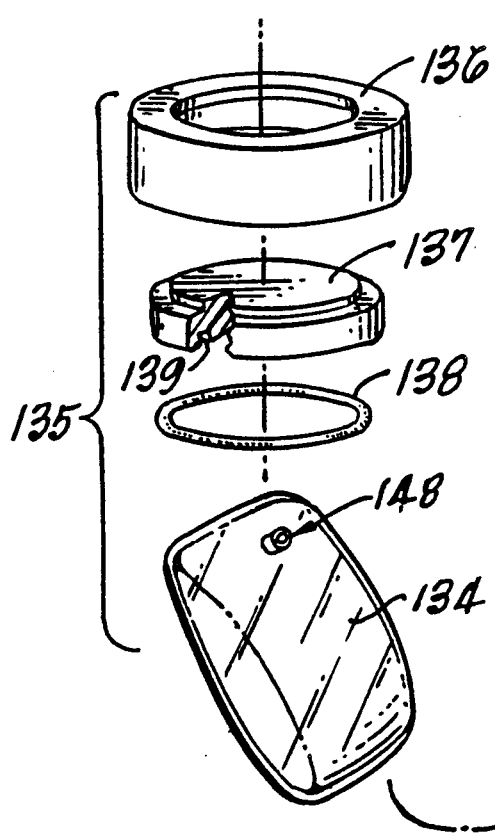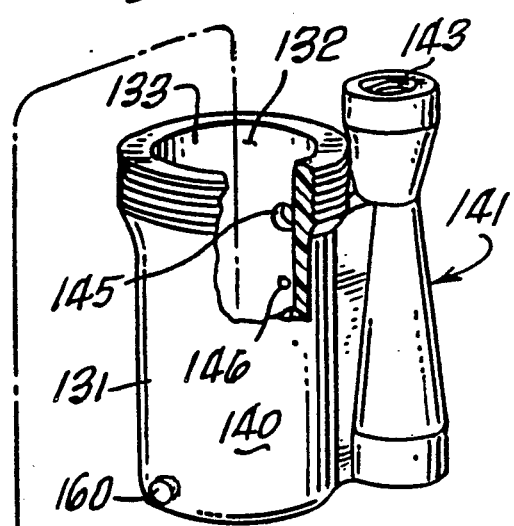

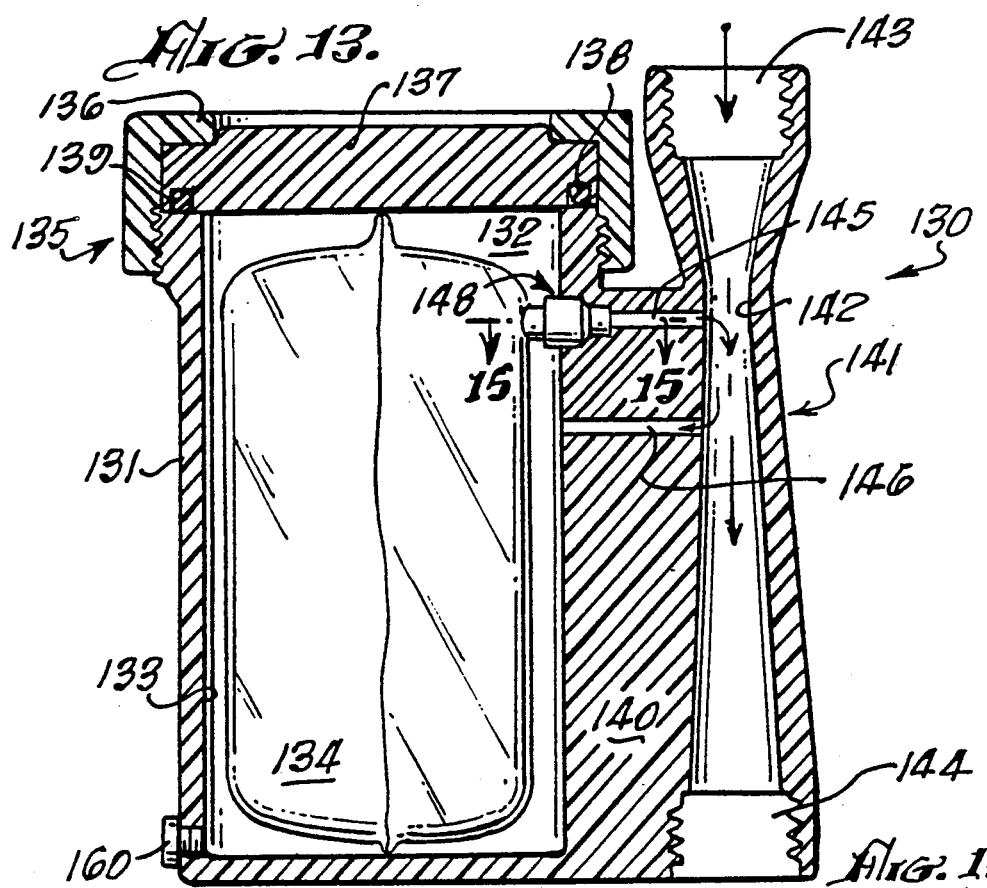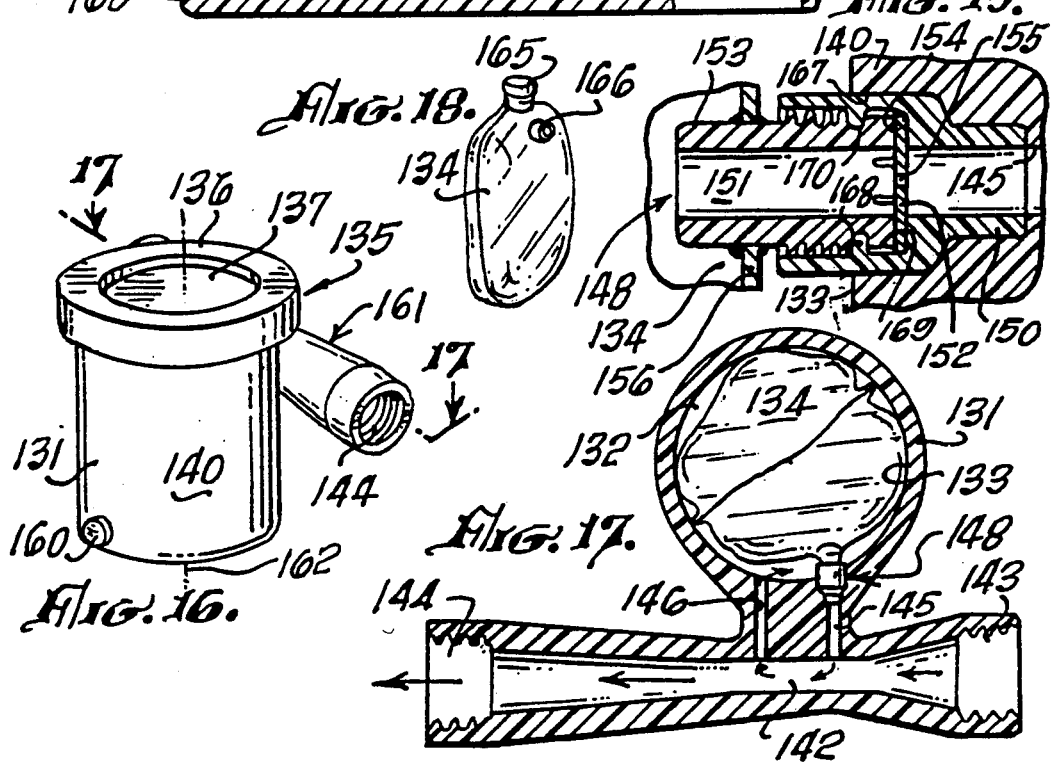

LIQUID FERTILIZER METERING SYSTEM

TECHNICAL FIELD

This invention generally relates to apparata which meters liquid fertilizer into a water flow conduit that is incorporated into an irrigation system, and is of that general character illustrated and described in my application Ser. No. 07/367,842, filed June 19, 1989, now U.S. Pat. No. 4,974,634, granted Dec. 4, 1990. This application is a continuation-in-part of said Letters Patent. More particularly, a major object here is to provide a highly advantageous design which, through a modified and perfected application of the operating principles set forth in said pending application, acts to simplify the construction and applicability of the apparatus in the field whereby minimal and expedient change of liquid fertilizer bag and metering orifice is handily and quickly achieved. The device accurately and efficiently meters solutions such as liquid fertilizer directly into a Venturi tube connected into the water flow conduit.

BACKGROUND OF THE INVENTION

1. Field of the Invention

This invention applies to watering and irrigation systems, examples of which are disclosed in U.S. Pat. Nos. 1,757,140; 2,058,901; 2,624,619; 3,386,808; 3,612,404; and 4,635,848.

2. Problems In the Prior Art

Although inventions of the nature involved here have been generated in the past, as taught by the above referenced prior art teachings, commercial and other uses of them have not obviated certain drawbacks in their features or uses. For example, clogging of conduits developed, particularly at or around check valves in the system apparata. The handling of, deposit in, and removal of bags containing liquid fertilizer from apparata containers have not been seriously considered in terms of combining such bags with elements of system apparata that facilitate working with such bags, so that such handling, deposit and removal would be accomplished quickly, efficiently and simply.

SUMMARY OF THE INVENTION

The invention is used in a system in which water treating is desired, and requires water to be withdrawn at a relative higher pressure generated in a water flow circuit, introduced into the invention for application to a bag of water treating or liquid fertilizer, which then is metered to a Venturi tube connected to the higher water pressure system being treated. A lower pressure channeling of the liquid is used in the apparatus in such a manner as to cause the discharge of the metered liquid fertilizer into the Venturi tube, mixing with water, and thence into the water flow conduit.

Further, the liquid contents, fertilizer or otherwise, is accurately metered into the water flow conduit via the Venturi tube by metering orifice features in the apparatus embodying the invention. Also, unique cartridge assemblies of the invention provide facilitation in the handling, depositing and removal of pliable liquid fertilizer bags in the apparatus.

One embodiment of the invention lies in a device including a metering head secured to a rigid container housing a liquid fertilizer bag. The mouth of the bag is attached to the container's lid which with the metering head is securely sealed to the container. The head incorporates a pair of passageways the first of which extends between or communicates with a higher pressure side of the Venturi tube and a first bore aligned therewith formed in the container's cap or lid, while the second passageway extends between or communicates with the restricted throat of the Venturi tube, at which a lower pressure exists, and a second bore aligned therewith and likewise formed in such lid. However, the second passageway communicates with the mouth of the bag, whereas the first bore in the lid communicates with the interior of or pocket in the container exteriorly of such bag. The second bore in the container's cap and its cooperating passageway constitutes a metering orifice for the liquid.

Another embodiment includes an adjustable orifice assembly comprising a rotatable metering valve. The valve includes a hollow plug inserted in the second of such passageways in the metering head and which provides for different metered amounts of liquid fertilizer to be introduced into the throat of the Venturi tube and thence to a system's water flow conduit.

In both embodiments, water is introduced into the container at a higher pressure to cause discharge at a lower pressure of liquid fertilizer out of its bag and into the metering head and to the Venturi tube and the main or water flow line or conduit.

Another embodiment utilizes the higher water pressure at the outlet of the Venturi tube rather than that at the inlet of the Venturi tube.

A unique characteristic of the invention lies in cartridge assemblies which include the filled bag, perforated holes or slots in the outer wall of the cartridges proper for introduction of higher pressured water to pressurize the bags and their liquid contents after the cartridge assemblies have been deposited in the apparatus, with the cartridges including metering orifices through which such liquid contents are measured as they discharge therefrom for ultimate deposition in and displacement along the water flow conduits.

Another unique characteristic of the invention is the simplicity of construction and arrangement between a liquid container in a body pocket of its metering apparatus and a metering assembly connecting the container to a restricted throat in a conduit through which water is flowing and with which the liquid's contents or material is mixed. Thus, an exchange of a collapsed bag for a filled bag is quickly and expeditiously accomplished.

An object of the invention is to provide a novel and improved liquid metering apparatus.

Another object of the invention is to provide adjustability of metering a liquid content deposited in such an apparatus and by which the mixture of the liquid and water is controlled.

Another object of this invention is to provide a unit or product readily adaptable to an already existing water flow line, by simply introducing a Venturi tube portion of the invention thereto.

A further object of the invention is to provide ease of deposit of a cartridge assembly including a bag containing liquid solution, such as fertilizer, into the apparatus.

A further object of the invention is to provide a unique cartridge assembly by which the filled bag is readily handled, deposited in and removed from an apparatus embodying the invention.

A further object of the invention is to eliminate clogging of metering apparata and water flow conduit lines.

Another object of this invention is to provide a simplified construction and arrangement of and for the elements of the apparatus, whereby a quick and effective removal of a collapsed bag and the substitution of a liquid material container into the apparatus is effected and achieved.

These and other objects and advantages of the invention will become more apparent upon a full and complete reading of the following description, the claims appended thereto, and the accompanying drawing comprising six (6) sheets of eighteen (18) FIGURES.

BRIEF DESCRIPTION OF THE DRAWING

FIG. 1 is a perspective view of an apparatus embodying the invention and as applied to a water flow line.

FIG. 2 is a view taken on line 2—2 of FIG. 1.

FIG. 3 is a view of a fragmentary portion of FIG. 2.

FIG. 4 is a cutaway and cross-sectional view of another embodiment of the invention.

FIG. 5 is a top view of the invention illustrated in FIG. 4.

FIG. 6 is an exploded perspective view of the invention illustrated in FIGS. 4 and 5.

FIG. 7 is a cross-sectional view of a fragmentary portion of another embodiment of the invention.

FIG. 8 is a view of a fragmentary portion of a modified form of the invention illustrated in FIG. 7.

FIG. 9 is a schematic view of an alternative embodiment of the invention.

FIG. 11 is a perspective view of another embodiment of the invention.

FIG. 12 is a top plan view of FIG. 11.

FIG. 13 is a view taken on line 13—13 of FIG. 12.

FIG. 14 is an exploded perspective view of the embodiment illustrated in FIG. 11.

FIG. 15 is a view taken on line 15—15 of FIG. 13.

FIG. 16 is a perspective view of another embodiment of the invention.

FIG. 17 is a view taken on line 17—17 of FIG. 16.

FIG. 18 is a perspective view of still another embodiment of the invention.

DESCRIPTION OF THE PREFERRED EMBODIMENT(S)

Figure 10:
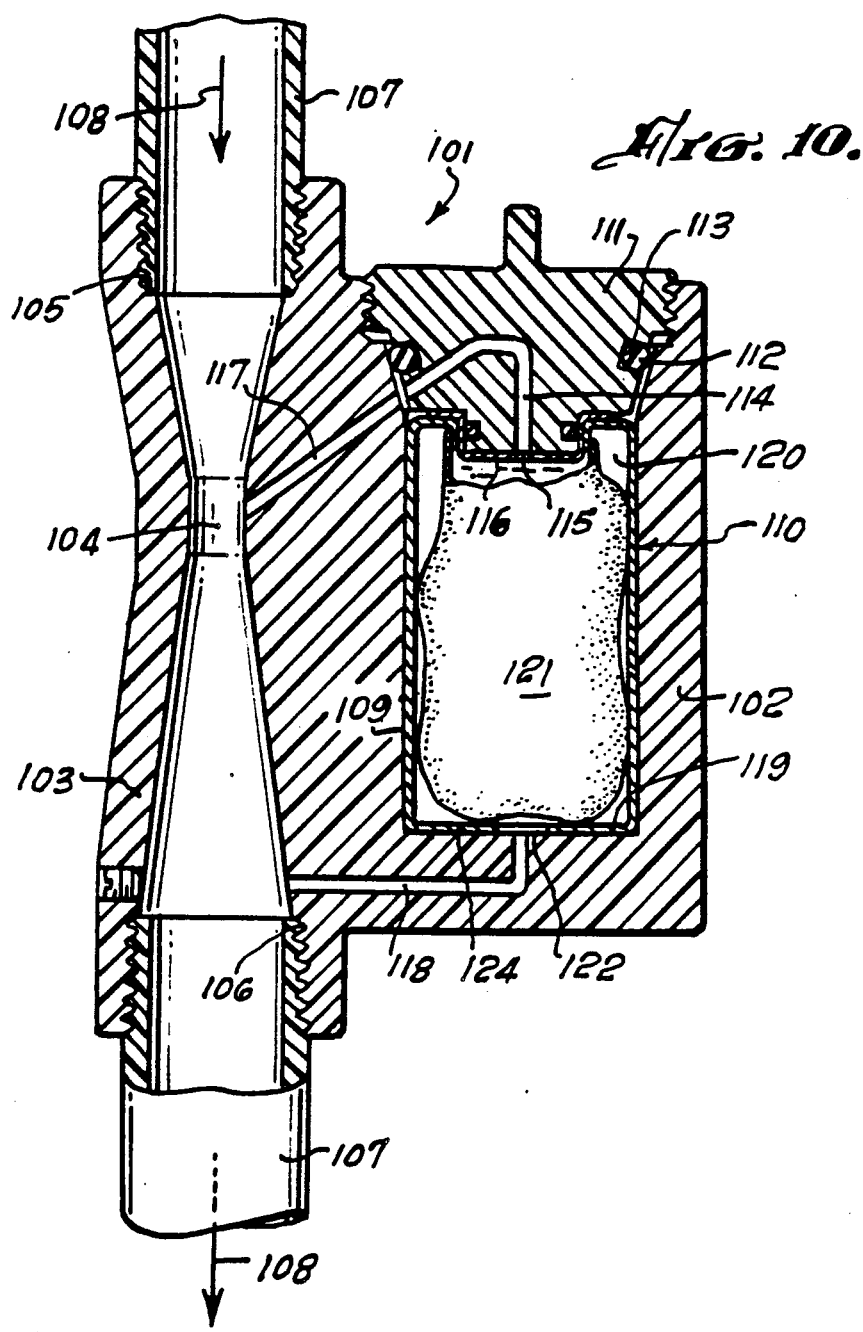
FIG. 10 is a cross-sectional view of another embodiment of the invention.

Referring now to the drawing wherein reference characters correspond to like numerals hereinafter, FIG. 1 illustrates an apparatus 20 embodying the invention. Apparatus 20 comprises a rigid container 21 having an interior or pocket 22 therein, FIG. 2, a sealing lid 23 mounted at its top and which includes an annular flange 24 which seats on an endless rim 25 forming a mouth 26 for container 21. A hub 27 centrally disposed of lid 23 depends therefrom and includes an annular groove 28, FIG. 3, in its periphery for mounting or attaching an endless bead 29 therein. Bead 29 forms a mouth 30, FIGS. 2, 3, for a bag 31 adapted to contain a supply of liquid fertilizer or other water treating solution 32. A measured metering bore 33 is formed through hub 27 and lid 23 and is in alignment with a passageway 34 of the same size formed in a metering head 35 mounted upon lid 23. Metering head 35 includes an annular flange 36 so that a threaded collar 37 having threads 28 and an inwardly extending flange 39 thereon secure together in a sealed manner, rigid container 21, its sealing lid 23, and the metering head or member 35, while bag 31 itself is situated, disposed within or deposited in container 21 and held in place by its bead 29 being seated in groove 28, although the container's wall and floor also may provide support for the bag whose nature is pliable.

Passageway 34 extends in metering head 35 to reach and communicate with a relatively low pressure point or the restricted throat 40 of a Venturi tube 41 preferably integrally formed, cast or molded into one unit with head 35. A second passageway 43 separate from passageway 34 connects a relatively high pressure point or an inlet port 44 for Venturi tube 41 to a second bore 45 in lid 23, separate from bore 33, bore 45 being in alignment with passageway 43. Bore 45 communicates with the pocket or interior 22 in container 21 exteriorly of the disposition of bag 31 when the latter is mounted to groove 28 on hub 27. A jet nozzle restriction is provided in bore 33 at restricted throat 40.

Inlet port 44 is conventionally attached, as by threading, to a water flow conduit or line 50, while an outlet port 51, FIG. 4, for Venturi tube 41 is attached likewise to another opening in conduit 50.

In operation of the embodiment of FIGS. 1-3, as water flows at a relatively high pressure through conduit 50, in the direction of arrows 52, FIG. 2, it reaches inlet port 44 of Venturi tube 41 where a portion of it seeks out and flows into passageway 43, continuing therethrough and into aligned bore 45 to be discharged into the interior or pocket 22 of container 21 exteriorly of bag 31 containing liquid content or fertilizer 32. Bag 31 is thus pressurized by the presence of water in pocket 22, while a lesser or relative lower pressure is being realized at restricted throat 40 in accordance with Venturi tube principle of operation. Thus, liquid fertilizer 32 discharges through metering bore 33, into aligned passageway 34 and then to throat 40 of Venturi tube 41. It mixes with water at throat 40, to flow in a metered or rationed fashion to outlet port 51 of the Venturi tube 41 and then continues to flow in water flow conduit 50 in the same flowing direction as the water was, prior to reaching apparatus 20.

In assembly of bag 31 to apparatus 20 as illustrated in FIGS. 1-3, bead 29 of mouth 21 of bag 31 is connected to groove 28 in hub 27 of lid 23. Bag and lid then are deposited in container 21, flange 24 seating on rim 25. Collar 37 is mounted to flange 36 if not already mounted thereon in the production of metering head 34, and thereafter is threadly mounted to mouth 26 of rigid container 21. During the sealing of metering head to rigid container, steps are taken to assure that passageways 34, 43 are aligned with their corresponding bores 33, 45 in lid 23 to provide the necessary communication of conduits for operation of the invention. Suitable indicia (not shown) may be incorporated on exterior portions of apparatus 20 to achieve such assurance. The inlet and outlet ports 44, 51 of Venturi tube 41 then are secured to their respective ends or openings provided in water flow conduit 50, and the invention is ready for the operation as described above.

Another embodiment of the invention is illustrated in FIGS. 4, 5 and 6. A hand-controlled adjustable metering valve 55 is provided in head 35, and comprises a hollow cylindrical plug or member 56 rotatably mounted in passageway 34 which is enlarged in size for such mounting, and is in alignment with bore 33 of sealing lid 23. A plurality of different sized orifices 57, FIGS. 4, 6, are formed in the circumferential body of member 56, spaced from one another, and located at a level in member 56 so as to be in alignment with passageway 34 of metering head 35 as such passageway proceeds to throat 40. Preferably, three orifices 57 are included about the circumferential body of member 56, being spaced ninety (90) degrees one from the next and in a progressive order, smaller to the largest. Any one of these orifices 57 is rotated into alignment with passageway 34 to provide a predetermined amount of liquid or fertilizer 32 for mixing with water at throat 40 of Venturi tube 41, so that a metered solution or mixture of water and (liquid) fertilizer flows through water line conduit 50. A stem 59 is mounted atop member 56, projecting outwardly of metering member 35 to form a short extension or shaft 60 having a flat 62, and onto which shaft and flat a manually-operable pointer 63 is suitably affixed. Indicia 65, FIG. 5, are printed or otherwise provided on top surface 66 of head 35, and are correlated to their correspondingly-sized orifices 57, to provide necessary information to the user as to which of the orifices 63 is in alignment with passageway 34 and throat 40. As illustrated in FIG. 5, "LOW" indicator 65 is correlated to the smallest sized orifice 57, "MED" indicator 65 (meaning medium-sized) is correlated to the next sized orifice 57, and so forth. In this illustrated embodiment, three (3) different sized orifices 57 are utilized, and thus only three indicia 65 are necessary, the last one being identified as "HIGH" which is correlated to the largest orifice 65 in cylindrical member 56 of this embodiment. An O-ring 67, FIG. 4, is mounted in a corresponding annular groove 68, FIG. 6, in stem 59, within head 35, to prevent leakage of fertilizer 32 through stem 59, while a depending detent 69, FIG. 4, mounted on the bottom of pointer 63, seats in one of holes 70, FIG. 5, which correlates to a corresponding one of indicia 65 that identifies a corresponding one of chronologically-sized orifices 57.

In operation, pointer 63 is set on, say, "MED" indicium 65, by manually rotating it and its detent 69 into its corresponding one of holes 70. The middle-sized one of orifices 57 then would be aligned with passageway 34 in metering head 35 and throat 40 of Venturi tube 41, to thereby provide discharge of liquid or fertilizer 32 from its bag 31, into bore 33, into the hollowness of plug or member 56, through the medium-sized metering one of orifices 57, and thence into passageway 34, when the pressure at restricted throat 40 is of lesser value than that of pressurized container 21. Container 21 is pressurized in its interior or pocket 22 in the same manner as described above in reference to FIGS. 1-3. Thus, a predetermined metered amount of liquid or fertilizer is developed at throat 40 in Venturi tube 41, for mixing with water therein so as to produce a desired water treated solution flowing in water line conduit 50.

It may be noted that pointer 63 as affixed to short shaft 60 prevents cylindrical member 56 from dropping downwardly further into the enlarged portion of passageway 34, to thereby assure alignment of orifices 57 with the horizontal portion of passageway 34, thus maintaining operativeness in this embodiment. Other suitable ways, of course, may be used to maintain such alignment, if desired.

FIG. 6 also illustrates a unique assembly 72 that can be utilized in any embodiment of the invention. The sealing lid 23 with its angular flange 24, along with hub 27 and its annular groove 28 are formed of a one-piece plastic or other suitable material. A ring, clip or other element suggested at 73 in FIG. 4, or a bead 29, FIG. 3, retains the mouth 30 of bag 31 to hug 27 for filled bag handling purposes, prior to deposit of such assembly into a rigid container 21, such as in the storage or during handling of the liquid-filled bag, without accidental discharge of the liquid from its bag. A circular groove 75 is conveniently provided in the top surface 76 of sealing lid 23, while at the bottom of such groove 75 one or more apertures or bores 77 are formed to extend throughout the lid's depth. A peel-off, film-like coating 78 (shown in phantom) is mounted atop surface 76 of sealing lid 23 to seal the liquid 32 in its bag 31 until bag 31 is to be deposited in pocket 22. Once assembly 72 is deposited within pocket 22, coating 78 can be removed prior to full assembly in apparatus 20. Thus, such assembly 72 including bag 31 may be more conveniently handled and deposited into pocket 22 from, say, a shipping carton of the like, in which at least bag 31 itself would be required to be made secure and non-spillable for shipping purposes prior to its use in apparatus 20.

In operation of the FIG. 6 embodiment, regardless of where passageway 43 aligns with circular groove 75, water therefrom will continue on into one or more apertures or bores 77 communicating with pocket 22 in container 21.

FIGS. 7 and 8 illustrate unique cartridge assemblies 80, 81, respectively, readily applicable in carrying out the invention. Cartridge 80 comprises an endless wall 82 having a plurality of small apertures 83 contained therein, a floor 84 and a top wall 85 having a centrally disposed opening formed by a downwardly turned circular wall 86. A pliable bag 87, containing liquid fertilizer 32, is disposed or otherwise mounted within cartridge 80, being preferably supported by wall 82 and floor 84. Bag 87 includes an opening at its top, formed by an upwardly extending circular wall 88 suitably attached to wall 86. A metering orifice plate 89 having a predetermined orifice 90 therein (set at the factory) is suitably mounted and secured in opening 86 of top wall 85. A twistoff lid, foil paper, plug or other suitable stopper (not shown) seals off orifice 90 until the entire cartridge 80 with bag 87 and its contents are to be deposited in a pocket 22 of a rigid container 21.

In this embodiment, an O-ring 91 seats in its corresponding annular groove 92 formed in hub 27, it sealing off the liquid contents within the cartridge proper upon insertion of hub 27 into the opening formed by wall 86, except for discharge of the liquid content through its bore 33 during operation of the invention, and which is carried out in the same manner as described above. The depth of hub 27 is such that O-ring 91 can frictionally grip wall 86 while bore 33 engages the metering orifice 90 of plate 89, in the assembly of apparatus 20, after the stopper (for non-spillage transportation purposes) has been removed from the opening formed by wall 86.

The small apertures 83 in cartridge wall 82 provide for introduction of relatively high pressurized water flowing from passageway 43 and bore 45 into the pocket in a container 21 (after deposit of cartridge 80 therein) to the interior or pocket 93 within the cartridge walls 82, 84, 85 surrounding filled bag 87, in operation of the invention.

It becomes apparent that cartridge assembly 80 provides for a convenient and expeditious manner of carrying, transporting and utilizing pliable bags of liquid fertilizer that otherwise would be difficult to handle, particularly when handling filled bags themselves on an individual basis for depositing into a rigid container 21 in carrying out the invention.

Although FIG. 7 illustrates a plurality of apertures 83 perforating wall 82, it should be understood that perforations, one or more, can take the form of slots, in any one or more of the assembly's outer walls including its floor and top walls.

FIG. 8 illustrates a stiff wall 94, corrugated or ribbed, for example, forming a cartridge assembly 95 in the invention. Assembly 95 also includes a stiff top wall 96 having a centrally disposed opening formed by a downwardly turned circular flange 97. A plate with a metering orifice 98 is suitably affixed to flange 97. Its engagement to hub 26 of the FIG. 7 embodiment is the same. In operation, cartridge 95 is deposited in a rigid container that is sealed off as described above. The action in the apparatus is the same as previously described.

FIG. 9 illustrates the invention as applied to an embodiment which pulls the required relatively high pressurized water in water flow conduit 50 from some other point than at inlet port 44 of Venturi tube 41. Such point is illustrated here as occurring at the exit or outlet port 51 of Venturi tube 41, although such an exit point need not be in a Venturi tube. A line 99 feeds fluid to metering head 35 through which it is fed into a rigid container 21 as described aforesaid, and to pressurize a bag of liquid content all as described aforesaid. The liquid dispenses from metering head 35 through a line 100 which is connected to a restricted throat 40, also as described aforesaid. This particular embodiment is useful where the Venturi tube 41 is not integrally formed with the metering head which in turn by itself may be more readily adaptable for affixation directly to both a rigid container and a filled bag prior to installation of the apparatus to a water treating system.

FIG. 10 illustrates an integral assembly 101 of the invention as being embodied or exemplified in a single body 102. Body 102 comprises a block of molded plastic material in which a Venturi tube 103 is formed, having its restricted throat 104 formed in a central portion of its tubular nature, between its inlet port 105 and its outlet port 106. Both ports 105, 106 are attached in conventional fashion to a water flow conduit 107 in which water flows in the direction of arrow 108. A pocket 109 is formed in body 102 and into which a cartridge assembly 110 (or even a simple state-of-the-art modification of a rigid container 21 with a filled fertilizer bag may do) is deposited. A threaded cap 111 mounts on a corresponding threaded portion of pocket 109 for closing it off, with an O-ring 112 being provided below such threaded portion in a corresponding annular groove 113 in cap 111, to seal off the pocket, such sealing required in operation of the invention. Cap 111 includes a passageway 114 the one end of which aligns itself with a metering orifice 115 provided in a plate or member 116 attached to the top wall of a cartridge assembly in a similar vein as disclosed above in reference to FIGS. 7, 8. The other end of passageway 114 aligns itself with a passageway 117 provided in body 102 between pocket 109 and the restricted thread 104 of Venturi tube 103, once lid 111 has been threaded to pocket 109 and in proper seating and sealing relation thereto. Another passageway 118 is incorporated into body 102 for communication between the floor or base 119 of pocket 109 and Venturi tube 103 at its outlet port 106. The cartridge assembly includes an interior or pocket 120 formed about its liquid bag 121, and a hole 122 is formed in its floor wall 124, for ingress of high pressured water into the interior or pocket 120 of the cartridge but exteriorly of the bag 121.

In operation of this FIG. 10 embodiment, as water flows in conduit 107 and into Venturi tube 103 of the body 102, its velocity is increased at throat 104 while the pressure there is reduced, in accordance with Venturi tube principal of operation. The water (actually the mixture of water and liquid content) flowing in the proximity of port 106 is at a pressure higher than the pressure at throat 104. The water there seeks out passageway 118 and is introduced through hole 122 to the interior or pocket 120 of the cartridge, exteriorly of filled bag 121, pressurizing such filled bag. Thus, discharge of its liquid content occurs, flowing through metering orifice 115 and into conduit 114, to continue to flow through passageway 117 in body 102 aligned therewith, flowing to throat 104 in Venturi tube 103. As a result, a metered amount of liquid fertilizer or other liquid content mixes with the desired amount of water flowing through Venturi tube 103, and such mixture then flows into water flow conduit 107.

Assembly of embodiments illustrated in FIGS. 4–10 appears to readily follow from that regarding the FIGS. 1–3 embodiment. However, the following description sets out steps peculiar to the particular embodiment being described, and which do not necessarily appear in the assembly of the FIGS. 1–3 embodiment. In the FIG. 4 embodiment, valve body 56 is inserted in enlarged passageway 33, its shaft 60 projecting past top surface 66, after which pointer 63 is press fit thereto or otherwise secured thereon. In the FIG. 6 embodiment, bag 32 is filled, then attached to hub 28, peel-off seal 78 applied to top surface 76 but removed after deposit of bag 32 into a pocket 22 of a container 21. In the embodiments of FIGS. 7 and 8, after fabrication of their respective cartridge assemblies 80, 81, they are filled prior to attachment of their metering orifice plates, and thereafter deposited within a rigid container, after which hub 26 engages the opening formed by the corresponding circular walls at the bottom of which the respective metering plate orifice 90, 98 are located. In the FIG. 9 embodiment, lines 99, 100 are suitably attached to their respective ports in both the metering head 35 and Venturi tube 41, which ports of course provide the proper communication of water and liquid passageways into and from apparatus 20 and water flow conduit 50. In the FIG. 10 embodiment, after cartridge assembly 110 and liquid fertilizer bag 121 are deposited in pocket 109, threaded lid 111 is rotated to a position whereby passageways 114, 117 are in alignment with each other.

Suitable and known materials are used for the various components forming embodiments of the invention. Pliable bag 31 is of suitable flexible plastic material not subject to breakage yet pliable enough to fold upon itself or otherwise collapse as pressure is applied to it. Rigid container 21 may be of metal, glass, plastic or other suitable material. The lid and cap, metering head, collar, and Venturi tube preferably are made of plastic, as well as the cartridge assemblies. "Plugs" are utilized to close off passageways in the metering heads where necessary, in the manufacture of such heads.

FIGS. 11–18 illustrate the improvement of this continuation-in-part application. Apparatus 130, FIGS. 11–15, comprises a rigid container 131 which includes a pocket 132 formed by a cylindrical wall 133 and into which a pliable bag or cartridge 134 filled with liquid material, such as liquid fertilizer, is disposed. A cap assembly 135 for container 131 is provided and comprises a flanged ring 136 threadable as shown to container 131, and a cap 137 having an O-ring 138 seated in an annular grroove 139 on its bottom. Tightening of ring 136 upon container 131 provides engagement of O-ring 138 upon the top of wall 133 to thereby seal pocket 132.

Container 131 is included or formed in the apparatus body 140 which has a longitudinal axis and which includes a tubular or Venturi tube 141 having a restricted throat 142 located between its inlet port 143 and outlet port 144. First and second passageways 145, 146 provide communication between tube 141 and pocket 132, the first 145 of such passageways connecting the restricted throat 142 with pocket 132 while passageway 146 connects tube 141 at a point between throat 142 and outlet port 144 with pocket 132.

A metering assembly 148 is operatively connected to passageway 145, and in the preferred embodiment, comprises a hollow housing 150 which includes a channel 151, a metering plate 152 mounted across such channel, and a hollow sleeve 153 that snaps into place in channel 151 to secure plate 152 against a shoulder 154 formed in housing 150 by reducing the size of channel 151. Metering plate 152 includes an orifice 155 through which liquid material in bag 134 is metered into passageway 145 and thus to Venturi tube 141 at its restricted throat 142. Sleeve 153 is preferably sealed or secured to a wall 156 of pliable bag 134, and includes its hollowness so that the interior of bag 134 communicates with orifice 155, reduced channel 151 and passageway 145.

The operation of this embodiment is like that of the previously described embodiments, however, briefly, as water flows into and through Venturi tube 141, filled-bag 134 is pressurized by the introduction of water flow through passageway 146 into pocket 132. As this occurs, pliable bag 134 is pressurized and collapses thereby, so that liquid material in bag 134 discharges through metering assembly 148 into passageway 145 and thus to restricted throat 142 of Venturi tube 141, thereby mixing with water flowing to outlet port 144.

A drain plug 160 is provided at or near the bottom of container 131 to remove sediment or other deposit that may accummulate in pocket 132.

FIGS. 16 and 17 illustrate an alternative embodiment to that in FIGS. 13–15, and in which a Venturi tube 161 is constructed generally at a right angle to the longitudinal axis 162 provided for container 131. The metering assembly 148 remains the same. The number of passageways 145, 146 remain the same, however, passageway 146 is in horizontal orientation to passageway 145 rather than in a vertical orientation thereto.

FIG. 18 illustrates an embodiment wherein a threaded cap 165 is employed upon a complementing threaded opening to a pliable bag 134, as distinguished from the sealed plastic pliable bag 134 of FIG. 13, while a removable solid plug 166 closes off the hollow sleeve 153 unitl it becomes part of the metering assembly 148 during the installation of the invention. Thus, bag 134 may be filled through such opening rather than through hollow sleeve 153.

It should be apparent that the operation of the FIGS. 16–18 embodiments is the same as that of the FIGS. 11–15 embodiment. Its assembly is relatively simple. Bag 134 with hollow sleeve 153 first is filled with the desired liquid material and then inserted into pocket 132. Sleeve 153 is attached to housing 150. Cap assembly 135 then is installed. The system is ready for use. While apparatus 130 remains in place in a water flow system, the system continues to operate even though the invention is not used because of no bag or a collapsed bag in pocket 132.

It also should be understood that the herein illustration in FIG. 15 of hollow sleeve 153 and housing 150 does not limit their attachment to one another to such illustration. The illustration shows a snap-in placement of sleeve to housing by means of an inwardly extending peripheral lip 168 over which the frontal end 169 of sleeve 153 passes, to be held in place by such lip 168 engaging an annular groove 170 in sleeve 153. Any other suitable means and manner, including glueing of parts, or by threads, clamps, or other snap-in types of fasteners may be used. Plastic materials are suitable for the manufacture of metering assembly 148, although metering plate 152 may be made out of metal.

Various changes and modifications may be made without departing from the spirit or scope of the appended claims. A ribbed structure may be utilized in the FIG. 7 embodiment rather than its cylindrical or polygonal wall 82, and holes or other perforations may thence be used in such modification. Such ribbing also may be horizontally oriented if desired. The Venturi tube may be formed in and of itself and then inserted or mounted into apparata embodying the invention, thus providing a standardization of size for apparata while allowing for different sized Venturi tubes to be installed or mounted therein. In the FIGS. 11–18 embodiments, any number of plates 152 with different sized orifices 155 provides for quick and efficient changes that may be desired in the metered flow of liquid material from bag 134. Also, the entire or any portion of metering assembly 148 may be suitable mounted to wall 156 of bag 134 rather than housing 150 being seated in a cavity 167 formed in body 140 at pocket 132. Or metering assembly 148 may be a separate assembly suitably connectable to bag 134 and passageway 145. Further, metering plate 152 may be incorporated as part of either hollow sleeve 153 or housing 150, should it be desired.

I claim:

1. In a liquid metering apparatus having a longitudinal axis and of the type having a venturi tube with restricted throat and outlet port, a pocket formed by wall means therein for disposition of a collapsible container therein, and a cover for sealing the pocket, and with a first passageway connecting the restricted throat to the pocket and a second passageway connecting a point between the restricted throat and the outlet port of the pocket, the improvement comprising
   a hollow housing mounted in the wall means forming the pocket, said hollow housing having a channel connected to the first passageway,
   a hollow sleeve operatively connected to such channel and for operative connection to the interior of the collapsible container, and
   orifice means mounted in the channel,
   whereby liquid in the collapsible container disposed in and sealed in the pocket is metered through the orifice means into the first passageway as the container is pressurized to collapse via the second passageway.

2. In the metering apparatus of claim 1, the venturi tube being at a right angle to the longitudinal axis for the apparatus.

3. In the liquid metering apparatus of claim 1 or claim 2,
   said orifice means comprising a plate having an orifice therein.

4. In the metering apparatus of claim 3, the hollow housing having its channel reduced therein to form a shoulder, the plate secured against the shoulder by the hollow sleeve in its operative connection to the channel.

* * * * *

UNITED STATES PATENT AND TRADEMARK OFFICE
CERTIFICATE OF CORRECTION

PATENT NO. : 5,094,269
DATED : March 10, 1992
INVENTOR(S) : John T. Agulia

It is certified that error appears in the above-identified patent and that said Letters Patent is hereby corrected as shown below:

On title page, item [63] "1981" should read --1989--

In column 10, line 44, : "of" should be read as -- to --.

Signed and Sealed this

Twenty-fourth Day of August, 1993

Attest:

BRUCE LEHMAN

*Attesting Officer*  *Commissioner of Patents and Trademarks*